United States Patent
Hsu

(10) Patent No.: US 8,908,012 B2
(45) Date of Patent: Dec. 9, 2014

(54) ELECTRONIC DEVICE AND METHOD FOR CREATING THREE-DIMENSIONAL IMAGE

(75) Inventor: Mao-Kuo Hsu, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 321 days.

(21) Appl. No.: 13/548,224

(22) Filed: Jul. 13, 2012

(65) Prior Publication Data

US 2013/0271572 A1    Oct. 17, 2013

(30) Foreign Application Priority Data

Apr. 13, 2012    (TW) ............................. 101113221 A

(51) Int. Cl.
*H04N 13/02*    (2006.01)
*H04N 7/18*    (2006.01)

(52) U.S. Cl.
USPC ............................... 348/46; 348/48; 348/135

(58) Field of Classification Search
USPC ............ 348/46–48, 135, 142, 239, 252, 262, 348/625, 222.1; 382/154, 266, 269, 275, 382/293
IPC ............. H04N 13/02,7/18, 5/262, 5/208, 5/225, H04N 9/09, 5/21, 5/228
See application file for complete search history.

(56) References Cited

U.S. PATENT DOCUMENTS

| 8,254,667 B2 * | 8/2012 | Kim et al. | 382/154 |
| 8,577,176 B2 * | 11/2013 | Kotake et al. | 382/154 |
| 2010/0231711 A1 * | 9/2010 | Taneno et al. | 348/135 |

\* cited by examiner

*Primary Examiner* — Sherrie Hsia
(74) *Attorney, Agent, or Firm* — Novak Druce Connolly Bove + Quigg LLP

(57) ABSTRACT

An electronic device for creating a three-dimensional image includes a number of image capturing units, an outline detecting unit, a coordinate determining unit, and an image synthesizing unit. Each image capturing unit captures an object located in one corresponding direction of a three-dimensional scene with different focal length and then captures a number of images of the object in each direction. The outline detecting unit detects an outline of the object in each captured image. The coordinate determining unit determines three-dimensional coordinates of each point on the detected outline. The image synthesizing unit synthesizes the detected outlines of objects from the captured images captured in the same direction together according to the three-dimensional coordinates of the outlines, creates a three-dimensional image along each direction with the corresponding synthesized outlines, and stitches the three-dimensional images of different directions together to obtain a combined image.

9 Claims, 5 Drawing Sheets

ELECTRONIC DEVICE AND METHOD FOR CREATING THREE-DIMENSIONAL IMAGE

BACKGROUND

1. Technical Field

The present disclosure relates to the field of image capturing, and particularly, to an electronic device and method for creating a three-dimensional (3D) image.

2. Description of Related Art

Since two-dimensional (2D) images lack realism due to the absence of depth queues, many techniques have been devised for producing images capable of presenting three-dimension effect. A stereoscopic photographic camera as well-known utilizes two separate objective lenses separated by a fixed distance to capture a left-eye image and a right-eye image of the object or the scene being photographed, and then the two images are synthesized together to form a 3D image. Other such cameras use a single objective lens moved from one location to another to obtain the 2D images which are then synthesized to a 3D image.

Although these types of cameras are somewhat useful, a new image capturing device is still needed.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

Figure 1:
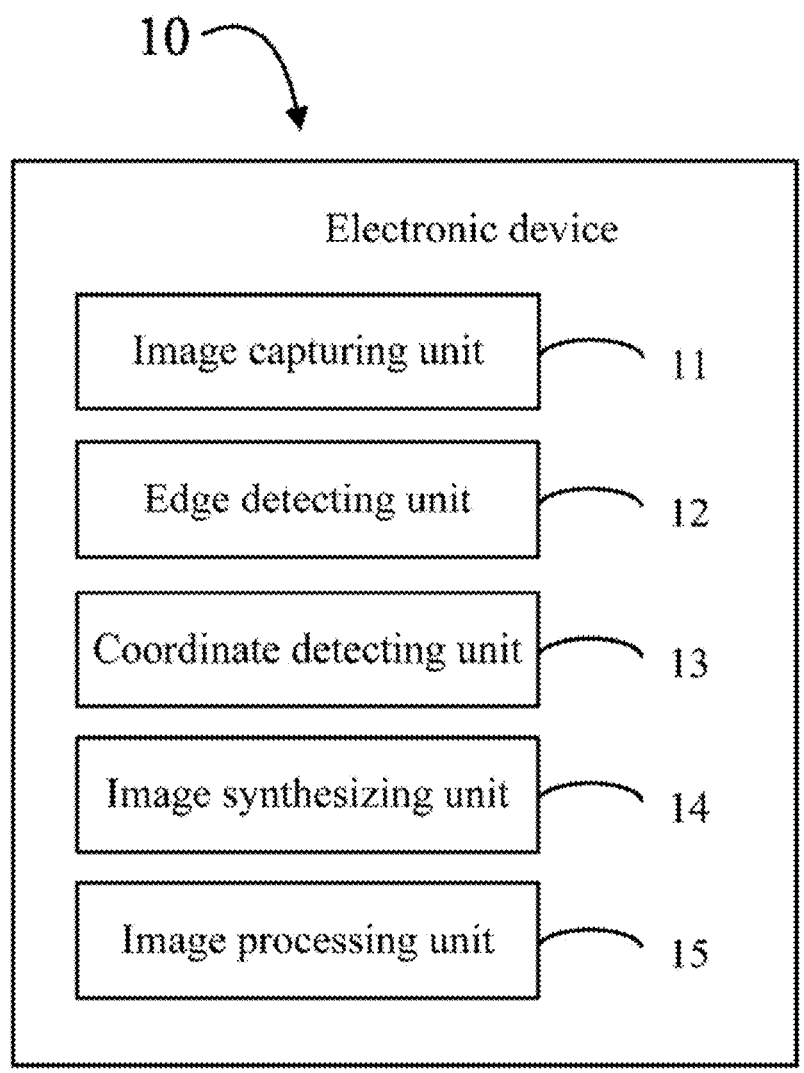
FIG. 1 is a block diagram of an electronic device, in accordance with an embodiment.

FIG. 1 is a block diagram of an electronic device 10 according to an exemplary embodiment. The electronic device 10 may be a digital camera, a tablet computer, or a mobile phone that has image capturing function. In the embodiment, the electronic device 10 includes more than one image capturing unit 11, an outline detecting unit 12, a coordinate determining unit 13, and an image synthesizing unit 14.

Each image capturing unit 11, including a camera lens and an image sensor such as a CCD image sensor or a CMOS image sensor for example, captures the object located in one corresponding direction of a three-dimensional scene with different focal length and then captures a variety of images of the object in each direction. The focal length may be determined by various known technologies, like auto-focusing.

Figure 2:
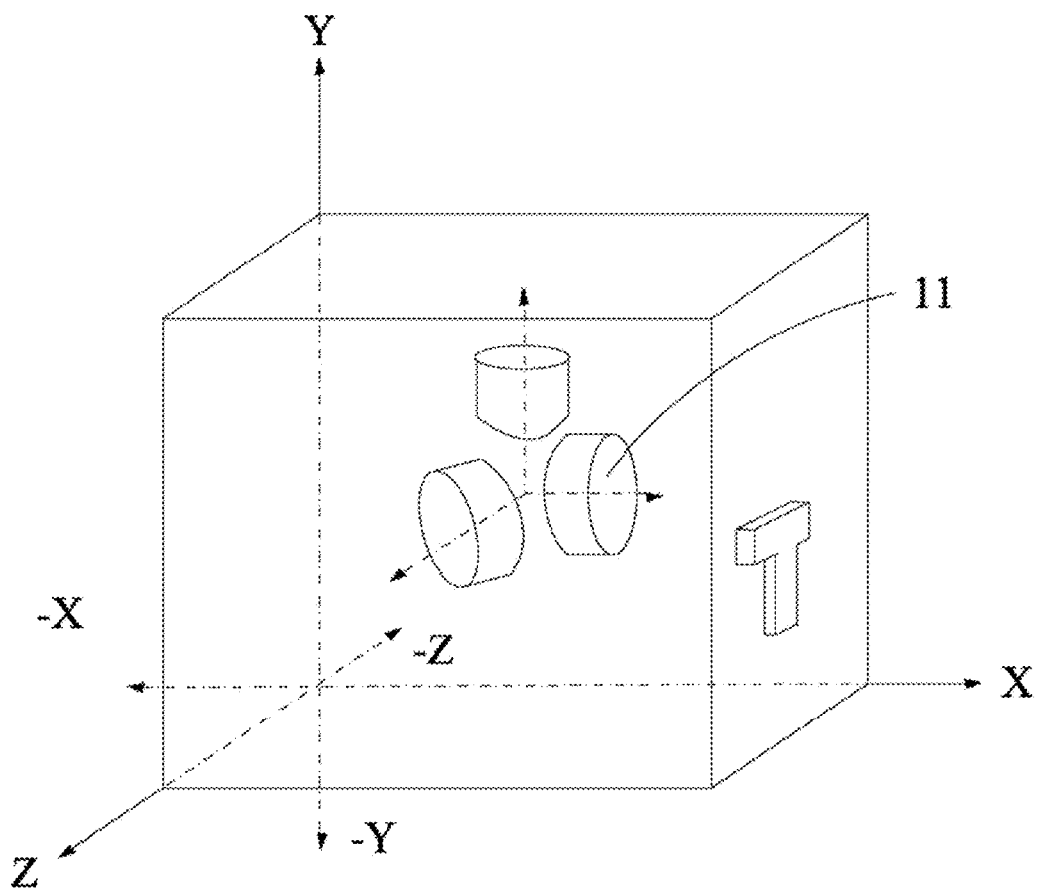
FIG. 2 is a schematic view showing an arrangement of three imaging unit of the electronic device of FIG. 1 with respect to a three-dimensional scene.

In the embodiment, the electronic device 10 includes three image capturing units 11, and each image capturing unit 11 includes a camera lens. As shown in FIG. 2, the optical axis of the camera lenses are arranged perpendicular to each other and respectively parallel with the X, Y, and Z axis of the three-dimensional scene, such that the three camera lenses can capture images of objects along the X, Y, and Z axis of the three-dimensional scene. Furthermore, the three camera lenses are capable of rotating with respect to each other by 180 degrees, such that the three camera lenses can capture images of objects along the −X, −Y, and −Z axis of the three-dimensional scene. Thus, the three camera lenses can capture images of objects located in all directions of the three-dimensional scene. However, it is notable that the number of the image capturing units 11 can be varied according to the need, and the optical axis of the camera lenses may not necessarily be coaxial with the X, Y, and Z axis of the three-dimensional scene, for example, the optical axis of the three camera lenses may angled with respect to each other by 120 degrees.

The outline detecting unit 12 detects the outline of the object in each captured image. In the embodiment, each captured image includes a background region and an object region of the object located within the background region and appearing as being placed over the background region. The outline detecting unit 12 detects the outline of the object according to the brightness difference between the object region and the background region. In the embodiment, the electronic device 10 further includes an image processing unit 15. The image processing unit 15 converts each captured image into a binary image that has only black and white colors for each pixel based on the original grayscale of the pixel, and the outline detecting unit 12 identifies the boundary between two regions respectively displayed in white and black as the outline of the object.

Figure 3A:
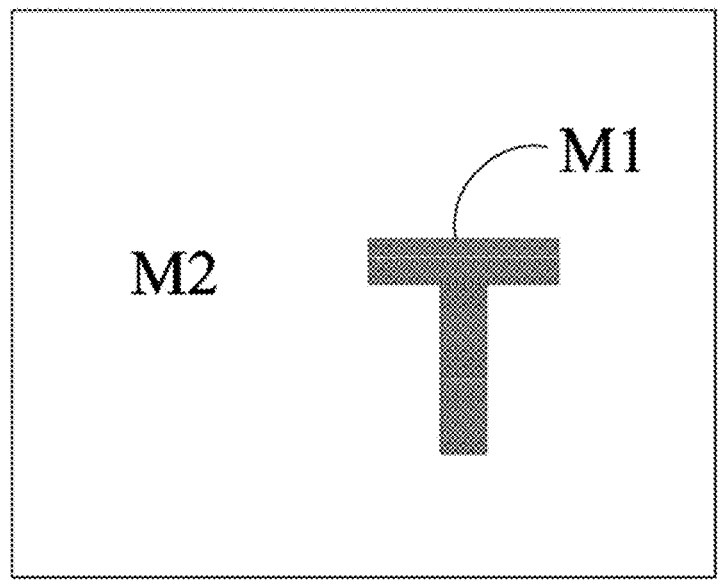
FIG. 3 is a schematic view showing two images captured by one imaging unit of FIG. 2.
Figure 3B:
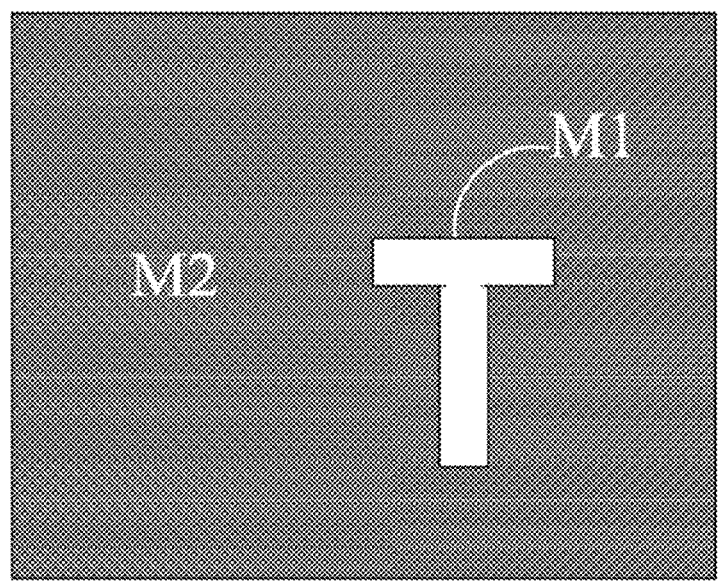

FIG. 3 shows a three-dimensional scene with a T-shaped object connected to the wall surface perpendicular to the X axis of the three-dimensional scene as an example. When captured by one image capturing unit 11 with optical axis coaxial with the X axis several times with different focal length, a variety of images are captured. Each captured image includes a background region of the wall surface and an object region of the T-shape object located within the background region.

For example, the imaging unit 11 respectively focuses on the wall surface and the T-shaped object to capture a first captured image and a second captured image. It is known that when focusing on the wall surface, the object region of the first captured image has a greater brightness than the background region, thus the image processing unit 15 controls the object region M1 to be displayed in white and the background region M2 to be displayed in black (see FIG. 3A). Similarly, when focusing on the T-shaped object, the object region of the second captured image has a brightness smaller than the background region, thus the image processing unit 15 controls the object region M1 to be displayed in black and the background region M2 to be displayed in white (see FIG. 3B). Then the outline detecting unit 12 can obtain the T-shaped boundary according to the brightness different between the regions respectively in white and black in each captured image, and identify the obtain T-shaped boundary to be the outline of the T-shaped object in the captured image.

The coordinate determining unit 13 determines the three-dimensional coordinates of each point of the detected outline, and the three-dimensional coordinates includes two plane coordinates of the point in the captured image and a depth coordinate of the point along the image captured direction. In this embodiment, the depth coordinate of the point is associated with the distance between the image capturing unit 11 and the objects (namely the object distance). In this case, the coordinate determining unit 13 determines the corresponding focal length of the image capturing unit 11 when the object is captured, and then calculates the object distance according to the determined focal length such that the depth coordinate of each point is obtained according to the calculated object distance.

Figure 4:
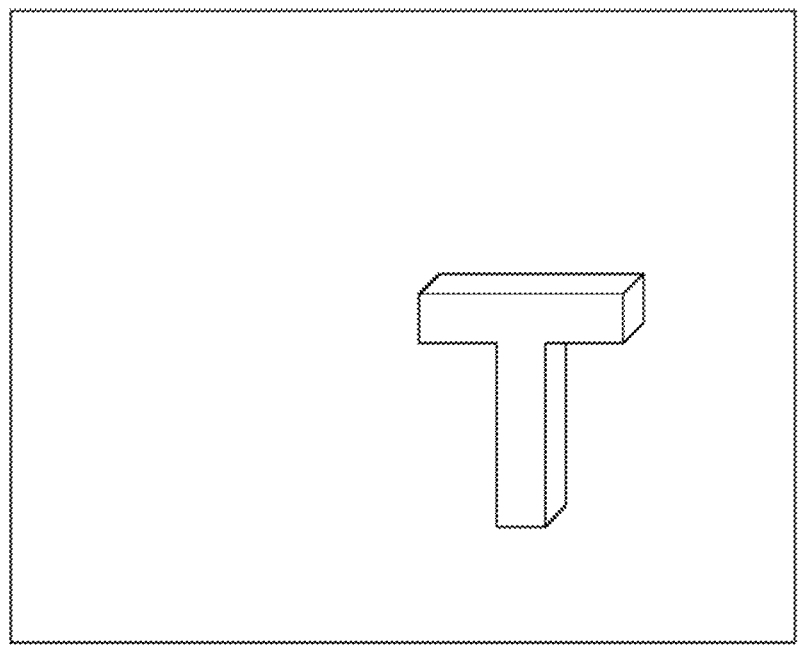
FIG. 4 is a schematic view showing a three-dimensional image synthesized by the two-dimensional images of FIG. 3.

The image synthesizing unit 14 synthesizes the detected outlines of the object from the captured images captured in the same direction together according to the three-dimensional coordinates of the outlines, creates a three-dimensional image along each direction with the corresponding synthesized outlines which can present a three-dimensional effect of the object, and then stitches the three-dimensional images of different directions together to obtain a combined image of the three-dimensional scene. FIG. 4 illustrates the imaging synthesizing unit 14 in accordance with one embodiment. The image synthesizing unit 14 synthesizes the two outlines respectively detected from the first and the second captured images together according to the three-dimensional coordinates of the outlines, thus, a three-dimensional image including the three-dimensional T-shaped object along X axis is obtained. Similarly, other three-dimensional images respectively along Y, Z, –X, –Y, and –Z axis are obtained, such that a combined image are created by stitching the three-dimensional images along different directions together.

Figure 5:
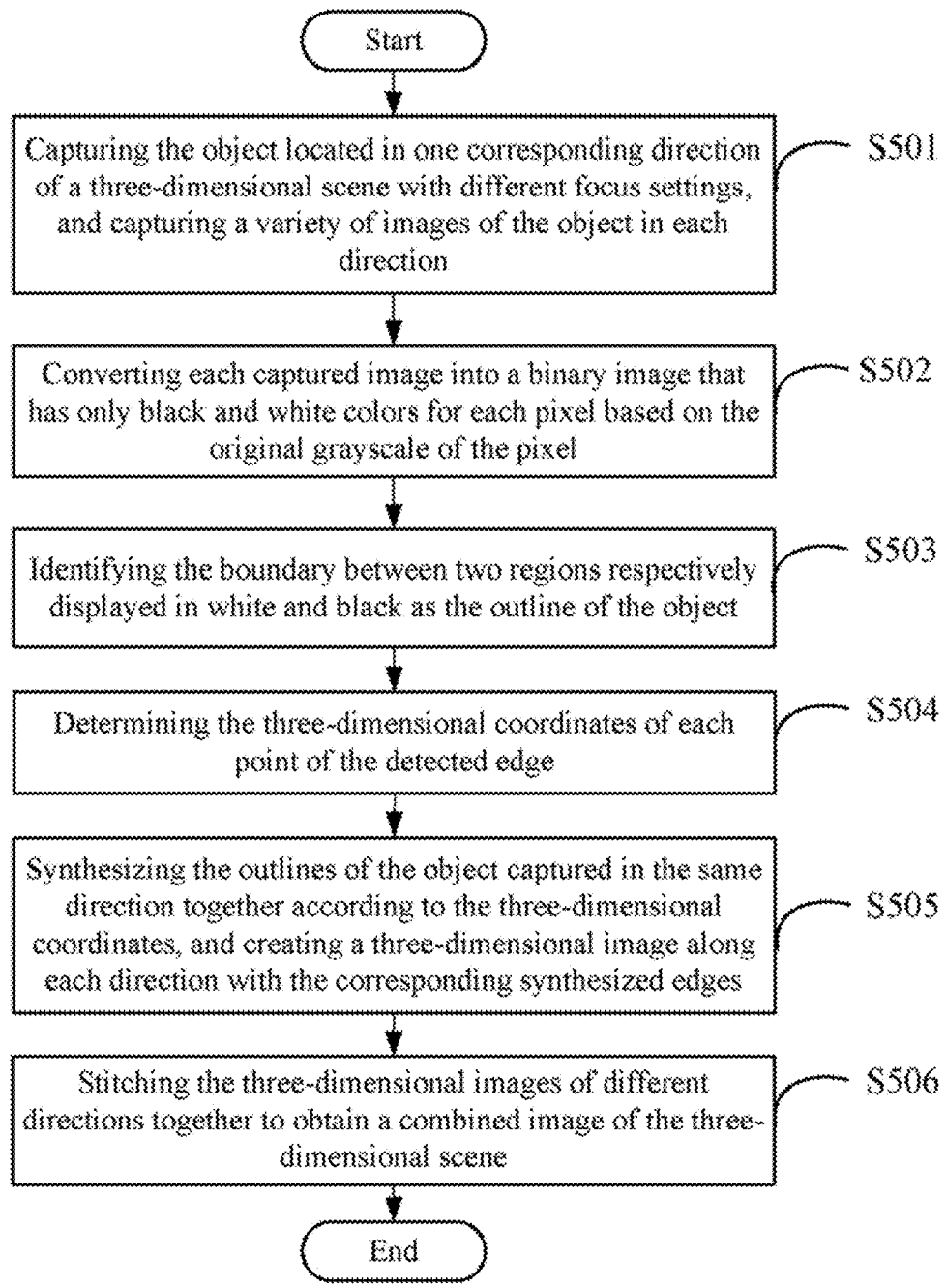
FIG. 5 is a flowchart of a method for creating a three-dimensional image, in accordance with an embodiment.

FIG. 5 is a flowchart of a method of creating a three-dimensional image implemented by the electronic device 10 of FIG. 1 according to an exemplary embodiment.

In step S501, each image capturing unit 11 captures the object located in one corresponding direction of a three-dimensional scene with different focal length and then captures a variety of images of the object in each direction.

In step S502, the image processing unit 15 converts each captured image into a binary image that has only black and white colors for each pixel based on the original grayscale of the pixel.

In step S503, the outline detecting unit 12 identifies the boundary between two regions respectively displayed in white and black as the outline of the object.

In step S504, the coordinate determining unit 13 determines the three-dimensional coordinates of each point of the detected outline.

In step S505, the image synthesizing unit 14 synthesizes the detected outlines of the object from the captured images captured in the same direction together according to the three-dimensional coordinates of the outlines, and creates a three-dimensional image along each direction with the corresponding synthesized outlines which can present a three-dimensional effect of the object.

In step S506, the image synthesizing unit 14 stitches the three-dimensional images of different directions together to obtain a combined image of the three-dimensional scene.

It is to be understood, even though information and advantages of the present embodiments have been set forth in the foregoing description, together with details of the structures and functions of the present embodiments, the disclosure is illustrative only; and that changes may be made in detail, especially in matters of shape, size, and arrangement of parts within the principles of the present embodiments to the full extent indicated by the broad general meaning of the terms in which the appended claims are expressed.

What is claimed is:

1. An electronic device with three-dimensional image creating function, the electronic device comprising:
    a plurality of image capturing units, each image unit to capture an object located in one corresponding direction of a three-dimensional scene with different focal length and capture a plurality of images of the object in each direction;
    an outline detecting unit to detect an outline of the object in each captured image;
    a coordinate determining unit to determine three-dimensional coordinates of each point of the detected outline; and
    an image synthesizing unit configured to:
    synthesize the detected outlines of objects from the captured images captured in the same direction together according to the three-dimensional coordinates of the outlines;
    create a three-dimensional image along each direction with the corresponding synthesized outlines, and
    stitch the three-dimensional images of different directions together to obtain a combined image of the three-dimensional scene.

2. The electronic device of claim 1, wherein the number of the plurality of image capturing units is three, each image capturing unit comprises a camera lens, and optical axis of the three camera lenses are arranged perpendicular to each other, and the three camera lenses are capable of rotating with respect to each other by 180 degrees.

3. The electronic device of claim 1, wherein the number of the plurality of image capturing units is three, each image capturing unit comprises a camera lens, and optical axis of the three camera lenses are angled with respect to each other by 120 degrees.

4. The electronic device of claim 1, wherein each captured image comprises a background region and an object region of the object located within the background region, and the outline detecting unit is configured for detecting the outline of the object according to a brightness difference between the object region and the background region.

5. The electronic device of claim 4, further comprising an image processing unit, wherein the image processing unit is configured for converting each captured image into a binary image that has only black and white colors for each pixel based on an original grayscale of the pixel, and the outline detecting unit is further configured for identifies a boundary between two regions respectively displayed in white and black as the outline of the object.

6. The electronic device of claim 1, wherein the three-dimensional coordinates of each point comprise a depth coordinate of the point along the image captured direction, and the depth coordinate of the point is determined according to a distance between the image capturing unit and the object when the object is captured.

7. A method for creating a three-dimensional image, comprising:
    capturing an object located in each direction of a three-dimensional scene with different focal length and capturing a plurality of images of the object in each direction;
    detecting an outline of the object in each captured image;
    determining three-dimensional coordinates of each point of the detected outline;
    synthesizing the detected outlines of objects from the captured images captured in the same direction together according to the three-dimensional coordinates of the outlines;
    creating a three-dimensional image along each direction with the corresponding synthesized outlines; and
    stitching the three-dimensional images of different directions together to obtain a combined image of the three-dimensional scene.

8. The method of claim 7, wherein each captured image comprises a background region and an object region of the object located within the background region, and step "detecting an outline of the object in each captured image" comprises:

detecting the outline of the object according to a brightness difference between the object region and the background region.

9. The method of claim 7, wherein the three-dimensional coordinates of each point comprise a depth coordinate of the point along the image captured direction, and the depth coordinate of the point is determined according to a distance between the image capturing unit and the object when the object is captured.

* * * * *